Sept. 11, 1934.    W. UMONT    1,973,235
APPARATUS FOR REMOVING WASTE OIL
Filed May 29, 1931    3 Sheets-Sheet 1
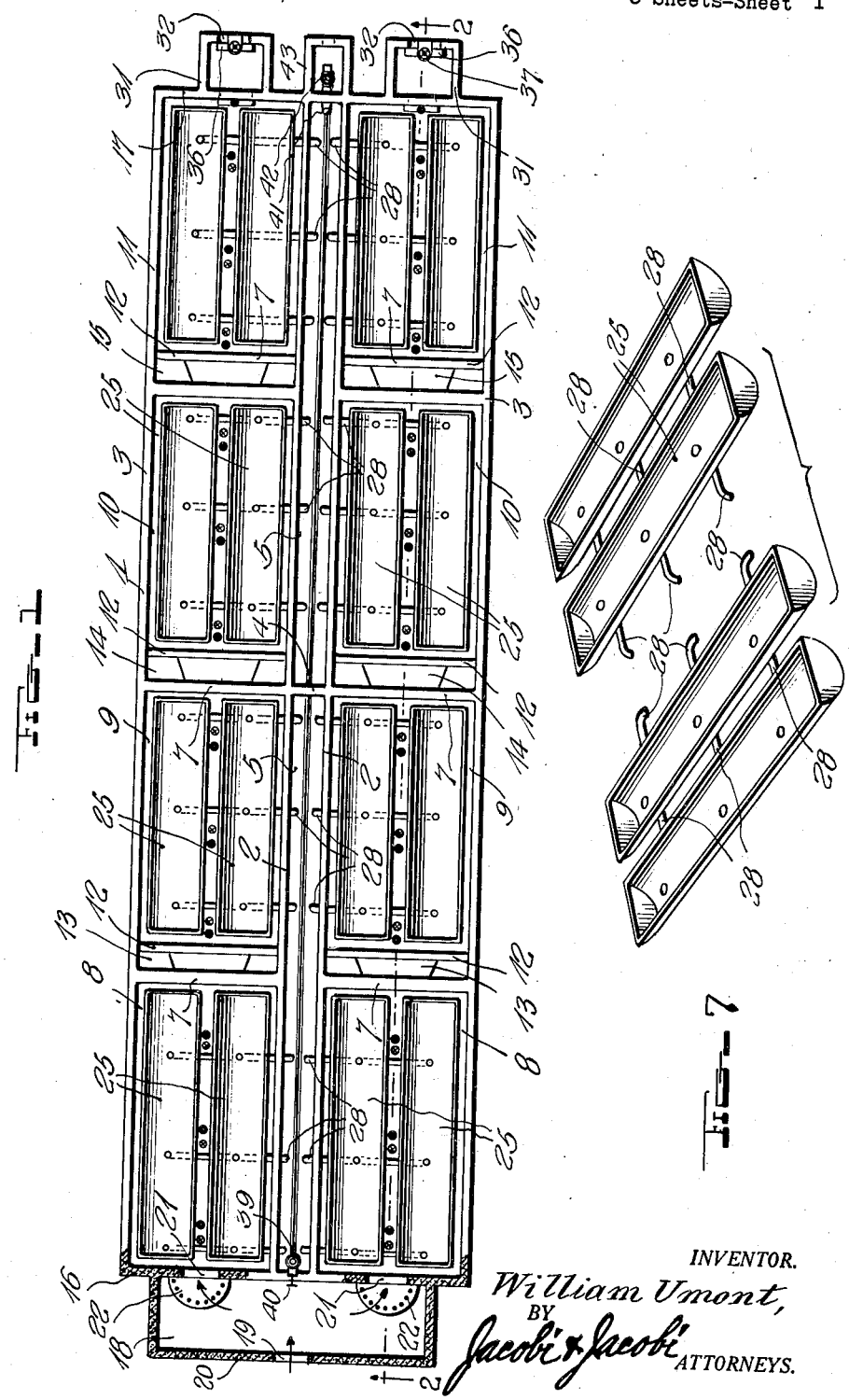
INVENTOR.
William Umont,
BY
Jacobi & Jacobi
ATTORNEYS.

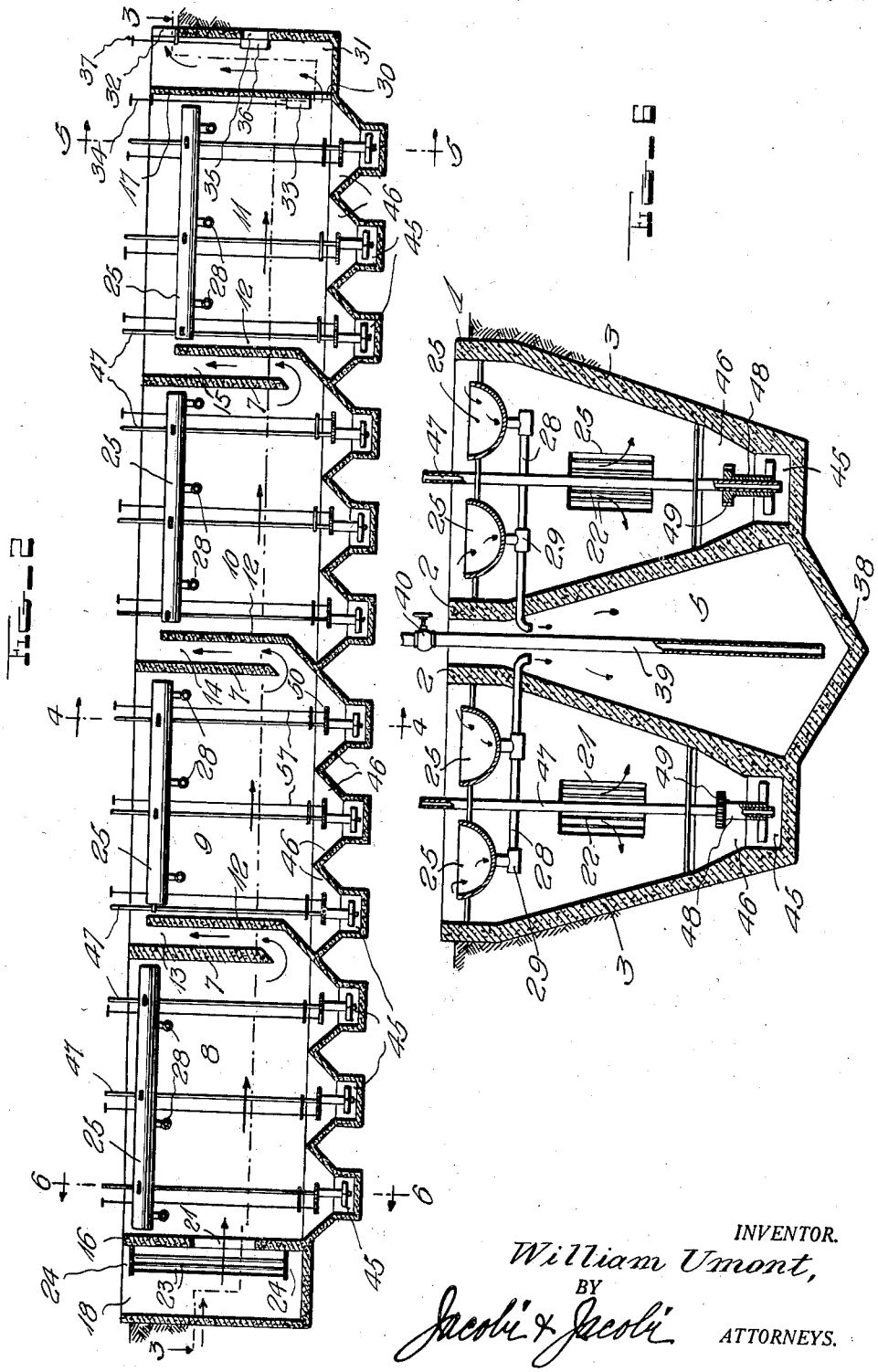

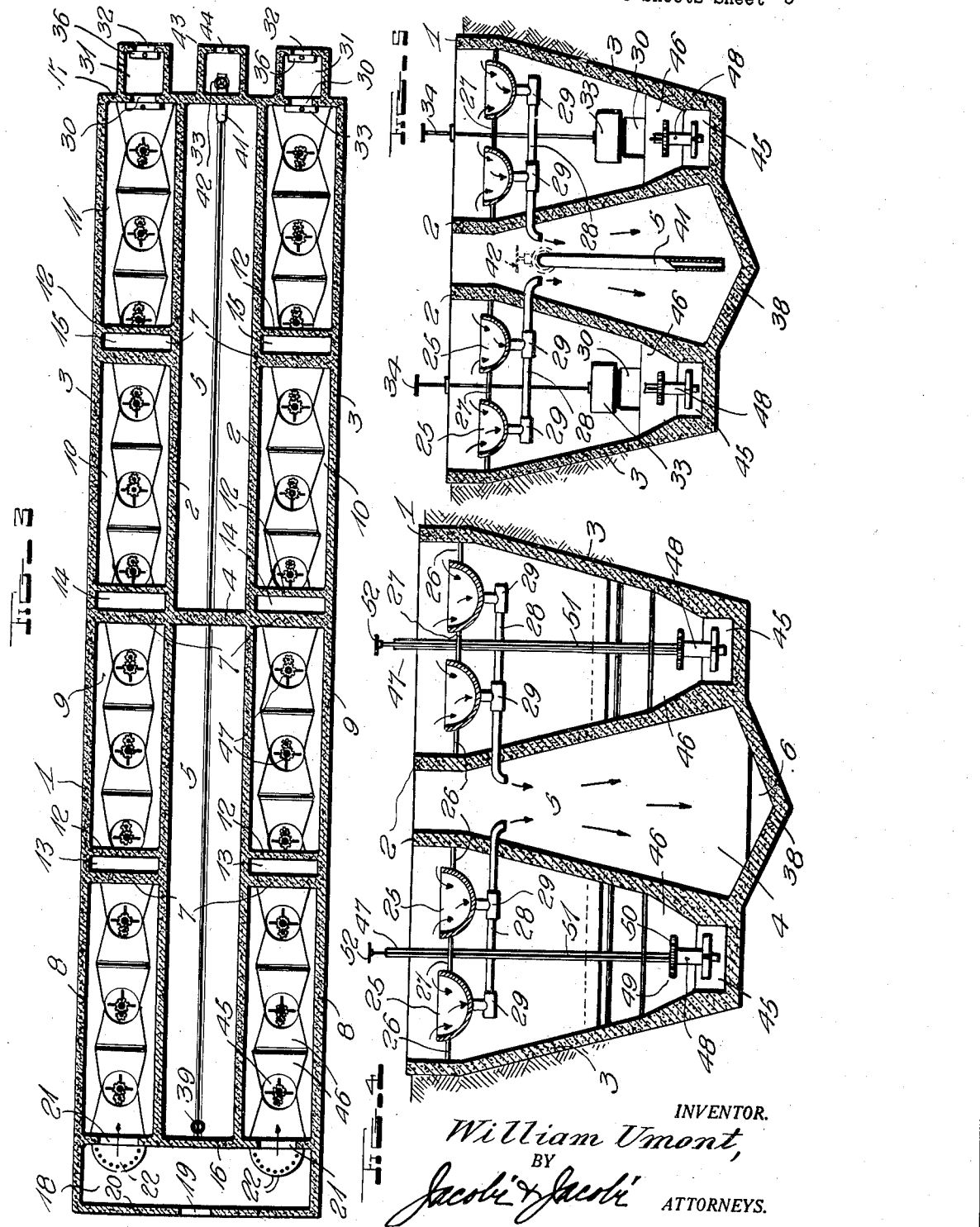

Patented Sept. 11, 1934

1,973,235

UNITED STATES PATENT OFFICE 1,973,235

APPARATUS FOR REMOVING WASTE OIL

William Umont, Dunellen, N. J., assignor of one-half to Carl W. Anderson, Dunellen, N. J.

Application May 29, 1931, Serial No. 541,080

4 Claims. (Cl. 210—51)

This invention relates to an apparatus for recovering waste oil and one object of the invention is to provide an apparatus through the use of which waste oil may be separated from water with which it has become mixed thereby permitting recovery and use of oil which would otherwise be lost.

The present invention constitutes an improvement over the apparatus disclosed in my co-pending application filed December 6, 1930, Serial No. 500,643.

One object of the invention is to provide an apparatus of this character through which water and waste oil swept out of a refinery or drained from stills and other apparatus in a refinery may be passed and the oil separated from the water and delivered into storage vats while the water passes into a pipe or other suitable conduit leading to a river or sewer.

Another object of the invention is to so construct the apparatus that as the intermingled oil and water passes through the same from one compartment to another the oil will have sufficient time to accumulate upon the surface of the water and passed into troughs from which it is delivered into storage vats.

Another object of the invention is to prevent trash from entering separating chambers of the apparatus and thereby eliminate danger of passages leading from one chamber to another becoming choked and interfering with proper operation of the apparatus.

Another object of the invention is to provide an apparatus of this character consisting of intercommunicating chambers having stepped relation to each other whereby water may easily flow from one chamber to another toward the water outlet and to further so construct the device that all of the water may be drained from the apparatus when necessary.

Another object of the invention is to provide an apparatus of this character wherein sludge and other muck may accumulate in the bottoms of the separating chambers and this sludge and other muck removed without emptying the chambers.

Another object of the invention is to provide an oil separating apparatus capable of handling a large quantity of oil and eliminate likelihood of oil passing out with the waste water due to the apparatus not having sufficient capacity.

The invention is illustrated in the accompanying drawings wherein:

Figure 1 is a top plan view of the improved separating apparatus.

Figure 2 is a longitudinal sectional view through the same, taken along the line 2—2 of Figure 1.

Figure 3 is a longitudinal sectional view taken horizontally through the apparatus through the line 3—3 of Figure 2.

Figure 4 is a transverse sectional view taken through the apparatus along the line 4—4 of Figure 2.

Figure 5 is a sectional view taken transversely through the apparatus near the outlet end thereof along the line 5—5 of Figure 2.

Figure 6 is a similar view taken transversely through the apparatus near the inlet end thereof along the line 6—6 of Figure 2, and Figure 7 is a perspective view of the troughs in which oil rising to the surface of water in the compartment is received and delivered into the oil vat or storage tank of the apparatus.

This improved apparatus for separating oil from water consists of a large body or tank 1 which may be formed of concrete or of any other material found suitable. The body is preferably oblong in shape when viewed in top plan as shown in Figure 1 and may be in the proportions of 120 feet long by 35 feet wide or any other dimensions found suitable. Walls 2 extend longitudinally in the body in spaced relation to side walls 3 thereof thereby defining side portions and an intermediate portion. The intermediate portion is divided intermediate its length by a wall or partition 4 to form oil reservoirs 5 which communicate through an opening 6 formed at the bottom of the partition 4. By omitting the partition 4 a continued oil reservoir will be formed and since the partition is provided with the opening at its bottom communication is established between these reservoirs and oil may easily flow from one chamber to another. The side portions of the body are divided by transversely extending walls or partitions 7 thereby defining a series of compartments 8, 9, 10 and 11 and by referring to Figure 2 it will be seen that these partitions or walls 7 terminate in spaced relation to the bottoms of the compartments and from the bottoms of these compartments extend baffles 12 which extend upwardly in spaced parallel relation to the partition and together with the partition define passages 13, 14 and 15 establishing communication between the compartments or chambers. The walls 2 and 3 and the end walls 16 and 17 are all of the same height and the partitions 4 and 7 are also of such height that their upper edges are flush with the upper edges of the walls 2 and 3 but the baffles 12 terminate in spaced relation to the upper edges of the partitions 7 and are progressively each of less height than the preceding baffle. Therefore, water passing upwardly through the passages 13, 14 and 15 may cause the chambers to be filled and the water will flow freely from one chamber or compartment to another. At one end of the body is formed an entrance chamber or screen box 18 having an inlet opening 19 formed in its wall 20 and having communication with the chambers 8 through openings 21 formed in the wall 16. Screens 22 formed of rods 23 extending vertically between upper and lower plates 24 guard the openings 21 and prevent any danger of trash passing through the openings 21 from the screen box into the chambers 8.

Within each of the chambers are mounted troughs 25 which extend longitudinally in the upper portions of the chambers and are spaced transversely from each other. While two troughs have been shown in each chamber it will be understood that a single trough or a larger number may be provided in each chamber if so desired. These troughs are supported in the chambers by rods 26 which are anchored in the walls 2 and 3 and each pair of troughs are connected and retained in proper spaced relation to each other by rods 27. Drain pipes 28 extend transversely beneath the troughs and communicate with the troughs through coupling 29, the ends of these pipes being extended through the walls or partitions 2 so that oil flowing from the trough through these pipes may be delivered into the vats or oil chambers 5. Referring to Figure 2 it will be seen that the troughs are so located in the upper portions of the chambers 8, 9, 10 and 11 that oil which rises to the surface of water in the chambers may flow over the upper edges of the walls of the troughs into the same and from the trough flow through these pipes 28 into the storage vats. The water having oil mixed with it enters the chamber 8 and a certain amount of the oil rises to the surface of the water. The chamber 8 communicates with the chamber 9 through the passage 13 and water passes through this passage from the lower portion of the chamber 8 into the chamber 9 and carries with it some of the oil which has not had an opportunity to rise in the chamber 8. Water passes from the chamber 9 through the passage 14 into the chamber 10 and from the chamber 10 through the passage 15 into the chamber 11. Oil accumulates in each of the chambers but as previously explained some of the oil passes with the water from one chamber to another. The water in the chamber 11 has very little oil in it and the water passing from this chamber through an opening 30 in the wall 17 into a tide water compartment 31 has no oil whatever or at the most only a very small quantity of oil. From the compartment 31 the water passes through an outlet or spillway 32 formed at the top of its outer wall and this water will flow through a suitable conduit into a sewer or river. Since the water flowing through the outlet 32 is practically free of oil it will not pollute the river. Communication between the chamber 11 and tide water compartment is controlled by a gate 33 having an actuating rod 34 and by properly adjusting this gate the speed at which the water flows through the separator may be controlled. A drain outlet 35 is formed intermediate the depth of the outer wall of the tide water compartment and in order to normally close this outlet there has been provided a gate 36 having an actuating rod 37. This gate is only opened when it is desired to drain the water from the compartment.

The oil flowing from the trough 25 through the pipes 28 accumulate in the vats or chambers 5 which intercommunicate through the passage 6. These vats have a very large capacity and by referring to Figures 4, 5 and 6 it will be seen that the bottom 38 of the vats taper transversely. A pipe 39 having a control valve 40 extends vertically near the outer end of one of the vats 5 and this pipe is intended for connection with a suction pump. This pipe extends downwardly in the vat with its lower end adjacent the transverse center thereof as shown in Figure 6 and therefore, the vats may be practically pumped dry when removing the oil. Since the two vats communicate only one oil outlet pipe is necessary. At the other end of the apparatus is provided a drain pipe 41 provided with a control valve 42 and opening into a water drain pocket 43 which is located between the tide water compartment 31 and provided with an outlet 44 to communicate with a sewer or river. The pipe 41 communicates with the oil vats at the opposite ends of the apparatus from the pipe 39 and by opening the valve 42 any water which may have accidentally passed into the vats and accumulated in the lower portions thereof may be drained out before pumping oil from the vats. It will thus be seen that the water may be effectively removed and only pure oil withdrawn from the vats and delivered to a storage tank or place of use.

The mixture of oil and water passing through the chambers 8, 9, 10 and 11 of the apparatus contain a certain amount of dirt and muck which is not excluded by the screen 22. This dirt and muck which is known as sludge has a tendency to settle in these compartments and in order to receive it the bottoms of these compartments have been formed with sludge pockets 45 to which lead incline surfaces 46 which may be referred to as flaring mouths for these pockets. This sludge is to be withdrawn and in order to do so there has been provided sludge pipes 47. The sludge pipes extend vertically in the chambers with their lower ends disposed centrally of the pockets 45 and about the lower ends of these pipes are disposed agitators 48 which are rotatably mounted and formed with pinions 49 engaged by gears or pinions 50 at the lower end of actuating rods or shafts 51. These shafts extend vertically in paralleled spaced relation to the pipes 47 and are rotatably mounted in suitable bearings, hand grips 52 being provided at their upper ends so that they may be easily turned and sludge in the pockets agitated to such an extent that it may be easily pumped out through the sludge pipes.

When this improved separating apparatus is in use waste oil from the refinery having water and dirt mixed with it is delivered into the screen box 18 and the screens 22 prevent large trash from passing through the openings 21 into the compartments 8. The mixture of oil and water passes from one compartment to another as previously explained until it reaches the compartments 11 from which it passes practically free of oil into the tide water compartments 31. In each of the compartments oil rises to the surface of the water and this oil flows into the troughs 25 from which it passes through the pipes 28 into the oil vats 5. The dirt settles to the bottoms of the compartments and accumulates in the sludge pockets 45 from which it is pumped through the pipes 47 at determined intervals of time, the shafts 51 being first rotated in order to agitate the sludge and permit it to be pumped easily through these pipes. After a sufficient quantity of oil has accumulated in the vats any water which may have accidentally passed into the trough and accumulated in the bottom of the vats is removed therefrom through the pipe 41 and as soon as all of the water has been removed the valve 42 for this pipe is closed and the valve 40 of the pipe 39 then opened and the oil pumped out of the vats through this pipe. When it is necessary to thoroughly clean or repair the apparatus the gate 36 is opened thereby allowing water to drain out of the compartments.

From the foregoing description of the construction of my improved apparatus the operation thereof and the method of applying the same to use will be readily understood. It will be seen that I have provided a simple, inexpensive and efficient means for carrying out the objects of the invention.

While I have particularly described the elements best adapted to perform the functions set forth, it is obvious that various changes in form, proportion and in the minor details of construction may be resorted to, without departing from the spirit or sacrificing any of the principles of the invention.

Having thus described my invention what is claimed is:

1. Apparatus for recovering waste oil comprising an elongated storage vat, a series of chambers at each side of said vat extending longitudinally thereof and each chamber having a conduit leading from its end adjacent its bottom and opening into a succeeding chamber adjacent the top thereof, receptacles in the upper portions of said chambers open at their tops whereby oil accumulating upon water in the chambers may flow into said receptacles, pipes for delivering oil from said receptacles into the storage vat leading from bottoms of the receptacles and extending through side walls of the chambers into the vat and constituting supports for the receptacles, and means to control flow of water through said chambers.

2. Apparatus for recovering waste oil comprising a body divided into a storage vat and a series of settling chambers at each side of the storage vat, each series consisting of a plurality of chambers disposed in end to end relation to each other and conduits establishing communication between adjoining ends of companion chambers, a tide water compartment at the outer end of the final chamber of each series, a water drain pocket at the corresponding end of said vat, means to control flow of water from said vat into said drain pocket, troughs supported in the upper portions of said chambers and having drain pipes leading therefrom for delivering oil into said vat, means to control flow of water through said chambers, and means to withdraw oil from said vats.

3. Apparatus for recovering waste oil comprising an oil storage vat, a series of settling chambers at each side of the storage vat, each series consisting of a plurality of chambers disposed in end to end relation to each other and conduits establishing communication between adjacent ends of companion chambers, a screen box at one end of the apparatus extending transversely of the chambers and vat and having outlets communicating with the first chamber of each series, screens in said screen box disposed in operative relation to the outlets thereof, troughs mounted in said chambers near the upper ends thereof and having drain pipes opening into said vat, and means to control flow of water through said chambers.

4. Apparatus for recovering waste oil comprising a body divided into settling chambers disposed in end to end relation to each other and having their adjoining ends communicating, a storage vat being also provided in said body and extending longitudinally thereof at one side of the series of chambers, a tide water compartment at one end of said body communicating with the final settling chamber, means to control flow of water through said chambers into said tide water compartment, a screen box at the other end of said body communicating with the first of the series of settling chambers, a plurality of troughs extending longitudinally in each settling chamber near the top, said troughs being spaced transversely from each other and connected by bracing rods, and drain pipes extending transversely in said chambers and having communication with the troughs through their bottoms and spaced from each other longitudinally thereof, said drain pipes extending through side walls of the chambers into the oil vat for delivering oil into the same and constituting supporting means for the troughs.

WILLIAM UMONT.